United States Patent Office 3,786,035
Patented Jan. 15, 1974

3,786,035
ALKALI METAL SULFIDE-ARYLENE SULFIDE POLYMER PROCESS
Jack S. Scoggin, Bartlesville, Okla., assignor to Phillips Petroleum Company
No Drawing. Filed May 15, 1972, Ser. No. 253,007
Int. Cl. C08g 23/00
U.S. Cl. 260—79.1                  7 Claims

ABSTRACT OF THE DISCLOSURE

An improved process for the preparation of arylene sulfide polymers is described wherein alkali metal sulfide reactants are prepared and reacted with polyhalo-substituted aromatic compositions in the preparation of arylene sulfide polymers in a reaction medium free of air or oxygen.

---

This invention relates to an improved process for the preparation of arylene sulfide polymers.

Commercial alkali metal sulfide reactants, when employed in the manufacture of arylene sulfide polymers, have been found to contribute to undesirable melt flow polymer properties. Consequently, various methods of treating commercial alkali metal sulfide reactants have been devised in order to reduce the melt flow values associated with arylene sulfide polymers produced from said commercial alkali metal sulfide reactants. The treatments, although effective in reducing arylene sulfide melt flow values, thereby improving the end use suitability of the polymer products, have been found to be inconvenient and/or uneconomical in arylene sulfide polymer manufacturing processes. If arylene sulfide polymers are to become commercially important and economically attractive to both manufacturer and end user, arylene sulfide manufacturing processes which economically reduce melt flow values of the polymers must be developed.

It is an object of this invention to provide an economical process for the production of arylene sulfide polymers. Another object is to provide an arylene sulfide polymer process which avoids the use of commercial alkali metal sulfide reactants. Still another object is to provide an arylene sulfide process which produces arylene sulfide polymers having desirable melt flow values. Additional objects will become apparent to those skilled in the art after reading the description and appended claims.

According to this invention, an improved process for the preparation of arylene sulfide polymers comprises the preparation of alkali metal sulfide reactants in the absence of air or oxygen, and the subsequent reaction of said reactants with polyhalo-substituted aromatic compounds in the absence of air or oxygen.

The exclusion of air or oxygen from reaction media during the preparation and use of alkali metal sulfide reactants is employed in the practice of this invention in order to minimize or eliminate the occurrence of alkali metal thiosulfate impurities in alkali metal sulfide reactants since the presence of said impurities is believed to contribute to variance in arylene sulfide polymer properties.

Preferably, the process is carried out under reaction conditions wherein both the alkali metal sulfide reactants and arylene sulfide polymers are prepared in the absence of oxygen or air and in the presence of an inert atmosphere such as nitrogen.

Any suitable process sequence can be employed in the practice of this invention providing the reaction medium or media are maintained in an oxygen or air free condition, such as preparation of alkali metal sulfide reactants in situ, with subsequent contact and reaction thereof with polyhalo-substituted aromatic compounds to form arylene sulfide polymers, or preparation of alkali metal sulfide reactants in a separate reaction medium, with subsequent storage and/or transfer to another reaction medium containing polyhalo-substituted aromatic compounds to form arylene sulfide polymers.

A preferred embodiment of this invention includes preparation of alkali metal sulfide reactants under air or oxygen free reaction conditions wherein hydrogen sulfide or alkali hydrosulfide and alkali metal hydroxide are continuously or intermittently contacted in stoichiometric proportions sufficient to yield in situ alkali metal sulfide reactants that contain at least 98 mole percent alkali metal sulfide reactant and a maximum of up to 2 mole percent of an impurity selected from the group consisting of alkali metal hydroxides, alkali metal hydrosulfides, or alkali metal thiosulfates. Even more preferred process conditions comprise the preparation and use of alkali metal sulfide reactants wherein the alkali metal sulfide is present in amounts of at least 99 mole percent for each 1 mole percent maximum of impurity selected from the aforesaid impurity group. Even more preferred are processes wherein alkali metal sulfide reactants are prepared and employed wherein the alkali metal sulfide reactant is present in amounts of at least 99.5 mole percent for each 0.5 mole percent maximum selected from the aforesaid impurity group.

Illustrative of alkali sulfide reactants prepared and employed in the practice of this invention include sodium sulfide, $Na_2S$ or other alkali metal sulfide, including the sulfides of potassium, lithium, rubidium and cesium, including therein anhydrous and hydrated forms.

Illustrative of polyhalo-substituted aromatic compounds that can be employed are 1,2-dichlorobenzene;
1,4-dichlorobenzene;
1,4,5-tribromobenzene;
N,N-dimethyl-2,5-dibromoaniline;
1,2,4,5-tetrabromobenzene;
hexachlorobenzene;
1,3,5-trichloro-2,4,6-triphenylbenzene;
1,2,4-trichlorobenzene;
methyl 2,5-dichlorobenzoate;
2,5-dichlorobenzamide;
1,4-dibromonaphthalene;
4,4'-dichlorobiphenyl;
3,4-dibromothiophene;
3,4-dichlorofuran;
3,4-difluoropyrrole;
2,5-dichloropyridine;
sodium 2,5-dibromobenzenesulfonate;
p,p'-dichlorodiphenyl ether;
3,3'-dichlorodiphenyl dimethylsilane;
di(2-methyl-4-bromophenyl)sulfoxide,;
methyl di(3-ethyl-4-chlorophenyl)phosphite;
4-bromophenyl 3-n-butyl-4-chlorophenyl sulfone, and
2,6-dichloropyrazine.

Because of their ready commercial availability and/or superior product, preefrred polyhalo-substituted aromatic compounds include 1,2-dichlorobenzene; 1,3-dichlorobenzene; 1,4-dichlorobenzene, and 1,2,4-trichlorobenzene. The monomers p-dichlorobenzene and 4,4'-dichlorobipheny' produce especially attractive polymers.

The reaction of alkali metal sulfide with polyhalo-substituted aromatic compound can be carried out in any suitable polar solvent substantially free or void of entrained air or oxygen at a temperature within the range of from about 125° C. to about 450° C., preferably from 175° C. to 350° C. Suitable polar compounds that can be employed include amides, lactams, sulfones, and the like. The improved arylene sulfide polymers produced by the process of this invention exhibit melting or softening points that range all the way from liquids at 25° C. to polymers melting about 400° C. Said polymers can be heat-treated in the absence of oxygen with an oxidizing agent either under vacuum or at atmospheric or superatmospheric pressures to increase the molecular weight by either a lengthening of a molecular chain or by cross-linking, or by a combination of both to improve such properties as tensile strength. Such treatment can be effected by heating the polymer, preferably at a temperature at least as high as to be within 100° F. of the melting point of the polymer. Such treatment can be carried out while contacting the polymer with air or under vacuum or under an inert gas such as nitrogen. The polymers produced by the process of this invention can be molded into a variety of useful articles by molding techniques which are well known in the art. Suitable molding techniques include injection molding, compression molding, vacuum forming and extrusion.

The following examples illustrate the process of this invention, including the best mode of practicing the invention.

EXAMPLE I

Sodium sulfide is prepared in the absence of air by the reaction of two moles of commercial sodium hydroxide with one mole of commercial hydrogen sulfide to yield one mole of sodium sulfide plus two moles of water. Approximately 1 mole percent excess of sodium hydroxide is employed, i.e., an amount of sodium hydroxide in excess of the exact stoichiometric requirement for 100 percent conversion of the hydrogen sulfide to sodium sulfide. Trace amounts, i.e., less than 0.2 mole percent, per mole of NaOH, of other ingredients such as $Na_2CO_3$, NaCl, $Na_2SO_4$, Fe, $NaClO_3$, $SiO_2$, $Al_2O_3$, and CaO are present in the commercial sodium hydroxide. Trace amounts, less than 3.5 mole percent, per mole of $H_2S$, of other ingredients such as $C_2H_4$, $C_2H_6$, $C_3H_8$, and $CO_2$ are present in the commercial hydrogen sulfide. The sodium hydroxide and hydrogen sulfide are contacted under a nitrogen blanket at a temperature of about 200° F. A sodium sulfide reactant having a purity of at least 99.0 mole percent is obtained. N-methyl-2-pyrrolidone solvent, 99.6 percent minimum purity, is added to the reaction medium, and solvent and sodium sulfide reactant are elevated in temperature to approximately 400° F. under an inert atmosphere of nitrogen to remove a portion of the water and other volatile substances, such as $C_2H_4$, $C_2H_6$, $C_3H_8$ and $CO_2$, formed during preparation of the sodium sulfide reactant. Thereafter, para-dichlorobenzene and solvent, both free of air, are added to the sodium sulfide reactant while the reaction medium is continuously maintained in an air free condition. The reaction medium including solvent, sodium sulfide, and para-dichlorobenzene is heated in the inert atmosphere at a nominal temperature of about 420° F. to 550° F. for a period of about 3 hours. Polymer and by-product NaCl are separated from the reaction effluent by flashing the solvent from the reaction medium. The NaCl by-product is removed from the polymer by extraction with water, followed by filtration to separate polymer and salt water. The polyphenylene sulfide polymer is dried before further processing.

EXAMPLE II

Sodium sulfide is produced in the absence of air by the reaction of one mole of commercial sodium hydrosulfide with one mole of commercial sodium hydroxide to yield one mole of sodium sulfide plus one mole of water. Approximately 1 mole percent excess NaOH is used. The commercial sodium hydrosulfide contains approximately 1.0 mole anhydrous NaHS for each 3.75 moles of $H_2O$, and trace amounts, i.e., less than 0.1 mole percent of $Na_2S_2O_3$, less than 3.0 mole percent of other ingredients, such as $Na_2S$, Fe, $Na_2CO_3$, per mole of anhydrous NaHS. Trace amounts, i.e., less than 0.2 mole percent, per mole of NaOH, of other ingredients, such as $Na_2CO_3$, NaCl, $Na_2SO_4$, Fe, $NaClO_3$, $SiO_2$, $Al_2O_3$ and CaO are present in the commercial sodium hydroxide. The reaction of sodium hydrosulfide and sodium hydroxide is carried out under a nitrogen blanket at a temperature of about 200° F. A sodium sulfide reactant of at least 99 mole percent purity is obtained. An N-methyl-2-pyrrolidone solvent, 99.6 percent minimum purity, is added to the reaction medium, and solvent and sodium sulfide reactant are elevated in temperature to approximately 400° F. under an inert atmosphere of nitrogen to remove a portion of the water formed during preparation of the $Na_2S$ plus other volatile substances formed during preparation of the sodium sulfide reactant. Thereafter, para-dichlorobenzene and solvent, both free of air, are added to the sodium sulfide reaction medium while the reaction medium is continuously maintained in an air free condition. The solvent, sodium sulfide, and para-dichlorobenzene are heated in the inert atmosphere at a nominal temperature of about 420° to 550° F. for a period of about 3 hours. Polymer and by-product NaCl is separated from the reaction vessel by flashing the solvent from the reaction medium. The NaCl by-product is removed from the polymer by extraction with water, followed by filtration to separate polymer and salt. The polyphenylene sulfide polymer is then dried before further processing.

EXAMPLE III

The extent of the variance of polyphenylene sulfide polymer melt flow values correlated with the sodium thiosulfate content of sodium sulfide reactants is illustrated by the melt flow data of Runs 1–3, set out in Table I hereafter. The sodium sulfide reactants were reacted with para-dichlorobenzene in the presence of N-methyl-2-pyrrolidone at a temperature range of 475 to 500° F. for 3 hours to form the polyphenylene sulfite test polymer. The polyphenylene sulfide melt flow characteristics were measured in accordance with the following procedure: approximately 20 grams of polymer was heated for 6 hours at 500° F., and subsequently preheated for 5 minutes in a modified ASTM Model D–1231 melt index apparatus at 650° F. The preheated sample was extruded under a constant 5 kg. weight load at 650° F. during a 10-minute interval and the extrudate weight in grams was determined.

TABLE I

| | Sodium sulfide reactant | | | Polyphenylene sulfide product |
|---|---|---|---|---|
| Run | $Na_2S$, moles | $Na_2S_2O_3$, moles | Mole percent $Na_2S$ | Melt flow values extrudate weight in grams |
| 1 | 0.75 | 0.095 | 88 | 4,000 |
| 2 | 0.75 | 0.035 | 95 | 96 |
| 3 | 0.74 | 0.007 | 99 | 28 |

The above data illustrates that the presence of sodium thiosulfate deleteriously affects the production of polyphenylene sulfide polymer of reduced or low melt flow values, e.g., 96 to 20 or even lower.

Since arylene sulfide polymers of low melt flow values are generally preferred in most commercial applications, the practice of this invention which minimizes or eliminates the presence of an alkali metal thiosulfate during the preparation of either the alkali metal sulfide reactant or arylene sulfide polymer is highly desirable and advantageous to the development of a commercial arylene sulfide polymer process.

Reasonable variations and modifications are possible within the scope of the foregoing disclosure and the appended claims to the invention.

What is claimed is:

1. In a process for the preparation of an arylene sulfide polymer by reacting in the absence of air or oxygen at least one polyhalo-substituted aromatic compound wherein the halogen atoms are attached to the ring carbon atoms with an alkali metal sulfide at a temperature and for a time sufficient to produce said polymer, the improvement which comprises preparing in situ said alkali metal sulfide by reacting in the absence of air or oxygen an alkali metal hydroxide with a sulfur compound selected from the group consisting of hydrogen sulfide and an alkali metal hydrosulfide.

2. A process in accord with claim 1 wherein said alkali metal sulfide reactant is the reaction product obtained from the reaction of sodium hydrosulfide and sodium hydroxide.

3. A process in accord with claim 1 wherein said alkali metal sulfide reactant is the reaction product obtained from the reaction of hydrogen sulfide and sodium hydroxide.

4. A process in accord with claim 1 wherein said alkali metal sulfide reactant contains at least 95 mole percent alkali metal sulfide and up to a maximum of 5 mole percent of an impurity selected from the group consisting of alkali metal hydroxides, alkali metal hydrosulfides, or alkali metal thiosulfates.

5. A process in accord with claim 1 wherein said alkali metal sulfide reactant is prepared in the presence of an inert gas, said reaction of alkali metal sulfide reactant and polyhalo-substituted aromatic compound is carried out in the presence of a polar solvent, at a temperature within the range of from about 125° C. to about 450° C.

6. A process in accord with claim 1 wherein said alkali metal sulfide is sodium sulfide, said aromatic compound is para-dichlorobenzene.

7. A process in accord with claim 6 wherein the alkali metal sulfide reactant contains at least 99 moles of sodium sulfide for every 1 mole of sodium thiosulfate.

References Cited
UNITED STATES PATENTS

| | | | |
|---|---|---|---|
| 2,538,941 | 1/1951 | Macallum | 260—79 |
| 2,513,188 | 6/1950 | Macallum | 260—79 |
| 3,268,504 | 8/1966 | Harris et al. | 260—125 |
| 3,354,129 | 11/1967 | Edmonds, Jr. et al. | 260—79 |

DONALD E. CZAJA, Primary Examiner

MELVYN I. MARQUIS, Assistant Examiner

U.S. Cl. X.R.
260—79; 423—561